(12) United States Patent
MacDonald et al.

(10) Patent No.: US 10,807,216 B2
(45) Date of Patent: Oct. 20, 2020

(54) CLAMP FOR USE WITH AN IMPACT TOOL

(71) Applicants: Luke Douglas MacDonald, Roddickton (CA); Damien William Canning, Roddickton (CA)

(72) Inventors: Luke Douglas MacDonald, Roddickton (CA); Damien William Canning, Roddickton (CA)

(*) Notice: Subject to any disclaimer, the term of this patent is extended or adjusted under 35 U.S.C. 154(b) by 160 days.

(21) Appl. No.: 15/989,078

(22) Filed: May 24, 2018

(65) Prior Publication Data

US 2019/0358780 A1 Nov. 28, 2019

(51) Int. Cl.
| | |
|---|---|
| B25B 5/10 | (2006.01) |
| B25B 21/02 | (2006.01) |
| B23K 37/053 | (2006.01) |
| B25B 5/14 | (2006.01) |
| B23K 101/06 | (2006.01) |

(52) U.S. Cl.
CPC .......... B25B 5/101 (2013.01); *B23K 37/0533* (2013.01); *B23K 2101/06* (2018.08); *B25B 5/147* (2013.01); *B25B 21/02* (2013.01)

(58) Field of Classification Search
CPC .......... B25B 5/10; B25B 5/101; B25B 5/102; B25B 5/147; B25B 5/06; B25B 5/067; B25B 5/00; B25B 21/02; B23K 2101/06; B23K 37/0533
USPC ............................................................ 269/3
See application file for complete search history.

(56) References Cited

U.S. PATENT DOCUMENTS

| | | | | |
|---|---|---|---|---|
| 4,363,475 | A | 12/1982 | McCarty | |
| 4,747,590 | A * | 5/1988 | Yang | B25B 5/003 269/249 |
| 5,135,209 | A | 8/1992 | Penny | |
| 5,568,916 | A * | 10/1996 | Gibbons | B25B 5/10 269/174 |
| 8,608,144 | B2 | 12/2013 | Thomas | |
| 2008/0048375 | A1* | 2/2008 | Rolfe | B25B 5/101 269/249 |
| 2009/0261519 | A1* | 10/2009 | Piggott | B23Q 3/061 269/9 |

FOREIGN PATENT DOCUMENTS

CN 103802049 A * 5/2014

OTHER PUBLICATIONS

English machine translation of CN1030802049A (Year: 2014).*

* cited by examiner

*Primary Examiner* — Monica S Carter
*Assistant Examiner* — Alberto Saenz
(74) *Attorney, Agent, or Firm* — Argus Intellectual Enterprise; Jordan Sworen; Daniel Enea (57) ABSTRACT

A clamp for use with an impact tool; the clamp having a nut for use with impact tools includes a screw on top, a safety handle, and a hole for carabiner clip. In use, a user adjusts the top screw to a length option desired, such that it doesn't slide onto object to be clamped. The clamp further comprises a grip on the safety handle. The clamp provides faster and more efficient use when using an impact tool.

20 Claims, 5 Drawing Sheets

CLAMP FOR USE WITH AN IMPACT TOOL

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. FIELD OF THE INVENTION

The present invention relates generally to the field of work holders and more specifically relates to a clamp with socket fastener means.

2. DESCRIPTION OF RELATED ART

Throughout the ages, many tools, devices, and fixtures have been proposed and used for clamping and securement of workpieces. It has been found that many prior art devices are deficient and cannot withstand the stresses placed on the same when subjected to high clamping torque common when tubes to be welded are misaligned, a common occurrence in boiler, refinery and other applications. Heating and cooling cycles common in welding can serve to weaken components generally utilized in the prior art, particularly the connection points between the clamping elements and feed screws. A suitable solution for reliable clamping is desired.

U.S. Pat. No. 5,135,209 to Thomas H. Penny relates to a pipe clamp apparatus. The described pipe clamp apparatus includes an apparatus arranged for selective mounting of plate-like coaxially aligned clamping plates, or alternatively the use of "V" shaped brackets mounted in a coaxially aligned relationship to clamp a pipe therebetween, wherein the brackets each include recesses formed at each side edge thereof, wherein the recesses are aligned relative to one another when secured together to provide access to a pipe joint positioned within the recesses for a machining procedure and the like.

BRIEF SUMMARY OF THE INVENTION

In view of the foregoing disadvantages inherent in the known work holder art, the present disclosure provides a novel clamp for use with an impact tool. The general purpose of the present disclosure, which will be described subsequently in greater detail, is to provide a clamp having a nut (connection means for coupling) for use with impact tools. The clamp may generally comprise a screw on top, a safety handle, and a hole for carabiner clip. A user may simply adjust the top screw to a length option desired, such that it doesn't slide on the object to be clamped. The clamp may further comprise a grip on the safety handle. The clamp provides for faster and more efficient use when using an impact tool.

A clamp for use with an impact tool is disclosed herein. The clamp for use with an impact tool includes a frame having a first-fixed jaw, a second-fixed jaw, and a length connecting the first-fixed jaw to the second-fixed jaw. The frame may include integrally the first-fixed jaw, the second-fixed jaw, and the length in a one-piece construction. The frame may further include a screw which may have a movable jaw and a collar; the screw held in length-adjustable stasis between the first-fixed jaw and the second-fixed jaw; the movable jaw and the collar able to travel upwardly and alternatively downwardly in a rotary motion along an axis parallel to the length when manipulated. The frame may further include a weld handle integrally coupled to the length of the frame.

During use, the weld handle provides improved stability to the clamp when held. As may be appreciated, a drive end may be located at a terminal end of the screw configured to couple to the impact tool via a socket such that the clamp is configured to manipulate at least two items such that the at least two items can be worked on based on in an adjacent relationship.

A method of using the clamp for use with an impact tool is also disclosed herein. The method of using the clamp for use with an impact tool may comprise the steps of: step one, providing the clamp having a frame including a first-fixed jaw, a second-fixed jaw, and a length connecting the first-fixed jaw to the second-fixed jaw, a first-gusset located where the first-fixed jaw meets the length of the frame and a second-gusset located where the second-jaw meets the length of the frame, a screw having a movable jaw and a collar, the screw held in length-adjustable stasis between the first-fixed jaw and the second-fixed jaw; and a weld handle integrally coupled to the length of the frame; step two, coupling the impact tool to a terminal end of the screw via a socket; step three, gripping the clamp via the weld handle; and step four, manipulating at least two items such that the at least two items can be worked on based on an adjacent relationship via the clamp.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a clamp for use with an impact tool, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to work holders and more particularly to a clamp for use with an impact tool as used to improve a means for handling clamp with socket fastener means to maintain a firm grip, particularly advantageous for while working at heights.

Generally, the improved "C" clamp, also known as "Kwick Klamp", may comprise an ergonomic handle, a pair of weld gussets for reinforcing the structural integrity of the clamp, and a screw for adjusting use of the clamp with an impact tool (such as a drill or the like).

Figure 1:
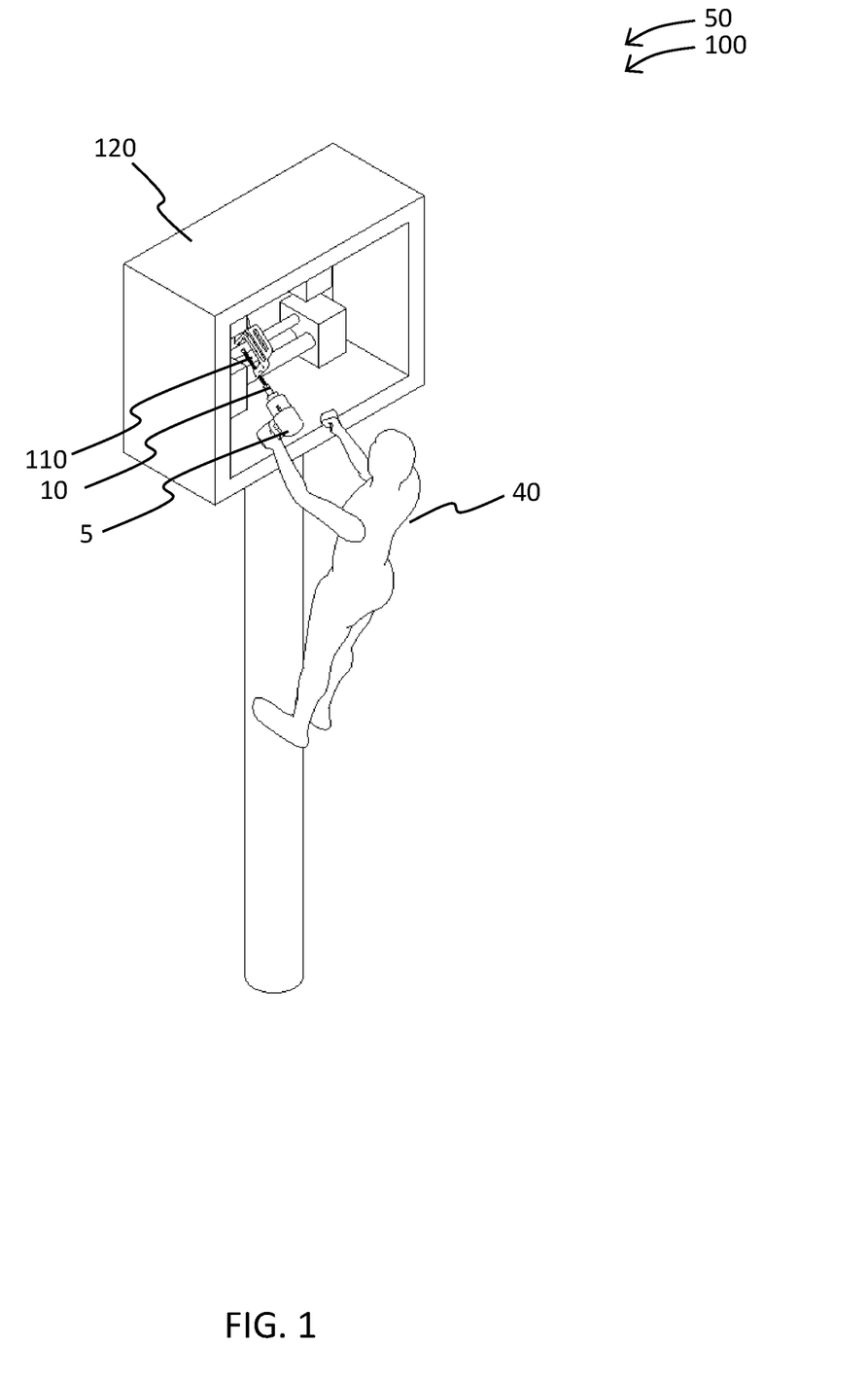
FIG. 1 is a view of the clamp for use with an impact tool during an 'in-use' condition, according to an embodiment of the disclosure.

Referring now more specifically to the drawings by numerals of reference, there is shown in FIGS. 1-4B, various views of a clamp 100 for use with an impact tool 5. FIG. 1 shows a clamp 100 for use with an impact tool 5 during an 'in-use' condition 50 by a user 40, according to an embodiment of the present disclosure.

As illustrated, the clamp 100 for use with an impact tool 5 may include a frame 110. The frame 110 may include a first-fixed jaw 112, a second-fixed jaw 114, and a length 116 connecting the first-fixed jaw 112 to the second-fixed jaw 114. The frame 110 may also include integrally the first-fixed jaw 112, the second-fixed jaw 114, and the length 116 in a one-piece construction.

The clamp 100 may further comprise a screw 120 having a movable jaw 122 and a collar 124. The screw 120 may be held in length-adjustable stasis between the first-fixed jaw 112 and the second-fixed jaw 114. The movable jaw 122 and the collar 124 may be able to travel upwardly and alternatively downwardly in a rotary motion along an axis parallel to the length 116 when manipulated.

The clamp 100 may further include a weld handle 130 integrally coupled to the length 116 of the frame 110. The weld handle 130 provides improved stability to the clamp 100 when held. A drive end is located at a terminal end of the screw 120 configured to couple to the impact tool 5 via a socket 10 such that the clamp 100 is configured to manipulate at least two items such that the at least two items can be worked on based on an adjacent relationship (side by side or one atop the other or the like).

According to one embodiment, the clamp 100 for use with an impact tool 5 may be arranged as a kit. The kit may include the clamp 100 having a frame 110, at least one screw 120, a weld handle 130, and a set of instructions. The instructions may detail functional relationships in relation to the structure of the clamp 100 for use with an impact tool 5 (such that the clamp 100 for use with an impact tool 5 can be used, maintained, or the like, in a preferred manner).

Figure 2:
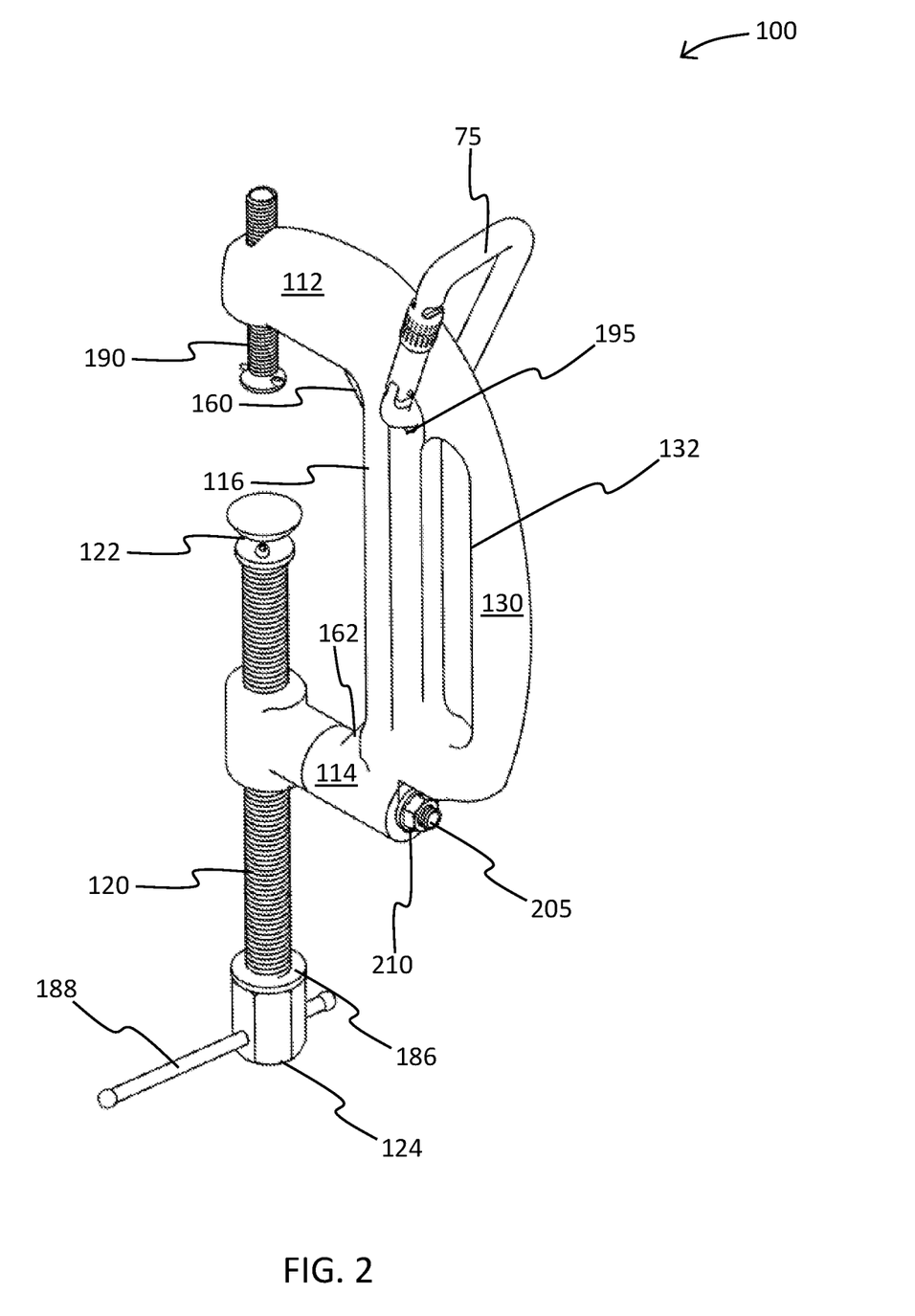
FIG. 2 is a perspective view of the clamp for use with an impact tool of FIG. 1, according to an embodiment of the present disclosure.

FIG. 2 shows a perspective view of the clamp 100 for use with an impact tool 5 of FIG. 1, according to an embodiment of the present disclosure. As shown, the frame 110 may comprise a first-gusset 160 located where the first-fixed jaw 112 meets the length 116 of the frame 110. In addition, the frame 110 may comprise a second-gusset 162 located where the second-fixed jaw 114 meets the length 116 of the frame 110. As may be appreciated, the first-fixed gusset and the second-fixed gusset may provide structural integrity for the frame 110 of the clamp 100 for improved durability. In one embodiment, the first-gusset 160 and the second-gusset 162 each have dimensions of approximately 1" by 1". In continuing to refer to FIG. 2, the first-fixed jaw 112 of the frame 110 may comprise a weld block. In one embodiment, the weld block may comprise dimensions of approximately 1" by 1". Other dimensions may be appropriate based on the relative size of the clamp 100.

In continuing to refer to FIG. 2, the clamp 100 for use with an impact tool 5 may comprise a hole 195 near a top of the weld handle 130. The hole 195 may be advantageously used to connect the frame 110 of the clamp 100 to a carabiner clip 75 or another fastener. In such a manner, the user 40 may easily connect and disconnect the clamp 100 to a utility belt or the like during use.

In continuing to refer to FIG. 2, the second-fixed jaw 114 of the frame 110 may comprise a terminal end opposite the screw 120. The terminal end may comprise a nut 205 and a washer 210 useful for tightening and loosening an inside-screw running through an interior channel of the second-fixed jaw 114 and connecting to either a swivel head 310 or a fixed head 320 as shown best in FIGS. 3A and 3B.

In still referring to FIG. 2, a bottom of the screw 120 may comprise a collar 124. The collar may comprise a through-hole for allowing a pin 188 to pass therethrough. The pin 188 may act as a handle facilitating rotation of the collar 124 clockwise and counter-clockwise in order to adjust the movable jaw 122.

In one embodiment of the present invention, the collar 124 may comprise a stop 186. As may be appreciated, the stop 186 may prevent downward movement of the wrench socket. The stop 186 acts as a barrier preventing the wrench socket from slipping down the thread of the screw 120. In addition, the screw 120 comprises a grind head at an opposite end. It should be noted that the screw 120 and the grind head are configured in combination for coupling to the clamp 100 to the impact tool 5.

In still referring to FIG. 2, the weld handle 130 of the frame 110 may comprise a grip 132 ergonomically configured for hand manipulation of the clamp 100 by the user 40. This may be particularly useful to minimize pinch points and for allowing the user 40 to maintain a firm grip of the clamp 100 while working at various heights.

In continuing to refer to FIG. 2, a proximal end of the grind head comprises a stop 186 useful to prevent the socket 10 from slipping down a thread of the screw 120. Further, the grind head further comprises a through-hole configured to allow a pin 188 to pass therethrough for aiding the user 40 in rotating the pin. In continuing to refer to FIG. 2, an embodiment of the clamp 100 may comprise a top screw 190 downwardly-insertable through the fixed-jaw of the frame 110 and configured for clamping the impact tool 5 between the top screw 190 and the grind head.

It should be noted that the impact tool 5 may comprise a pneumatic power tool or an electric power tool. Further, those with ordinary skill in the art will now appreciate that upon reading this specification and by their understanding the art of impact tools 5 as described herein, methods of coupling the clamp 100 to a variety of impact tools 5 will be understood by those knowledgeable in such art.

Figure 3A:
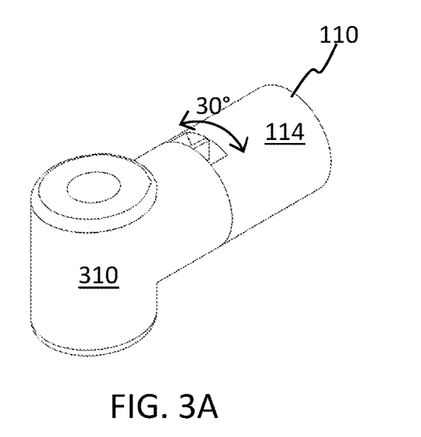
FIG. 3A is a perspective view of a swivel head of the clamp for use with an impact tool of FIGS. 1-2, according to an embodiment of the present disclosure.
Figure 3B:
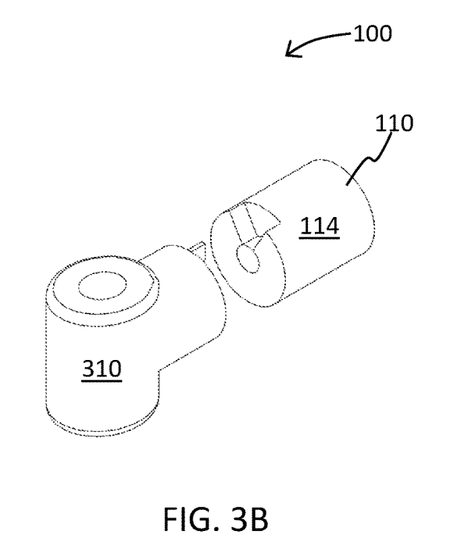
FIG. 3B is an exploded view of the swivel head of the clamp for use with an impact tool of FIGS. 1-2, according to an embodiment of the present disclosure.

FIGS. 3A and 3B are perspective views of the swivel head 310 of the clamp 100 for use with an impact tool 5 of FIGS. 1-2, according to an embodiment of the present disclosure. As shown, the swivel head 310 may rotate up to 30 degrees about an axis when the swivel head 310 is connected to the second-fixed jaw 114 of the frame 110 having a female opening that is partially cut-out to allow for 30-degree rotation. The swivel head 310 comprises a male insert that may fit within the female opening, the male insert narrower than the female opening allowing the swivel head 310 to rotate left or right 15 degrees in either direction. As may be appreciated, the swivel head 310 allows for additional maneuverability of the impact tool 5 for versatile use of the clamp 100.

Figure 3C:
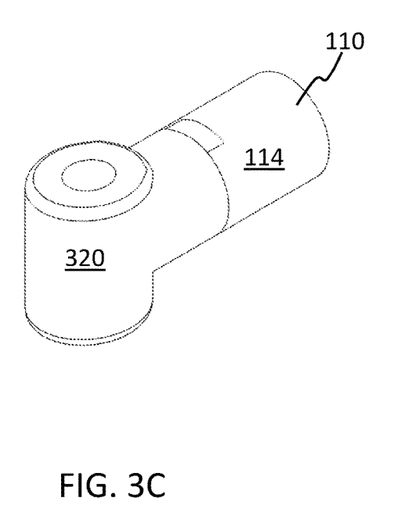
FIG. 3C is a perspective view of a fixed head of the clamp for use with an impact tool of FIGS. 1-2, according to an embodiment of the present disclosure.
Figure 3D:
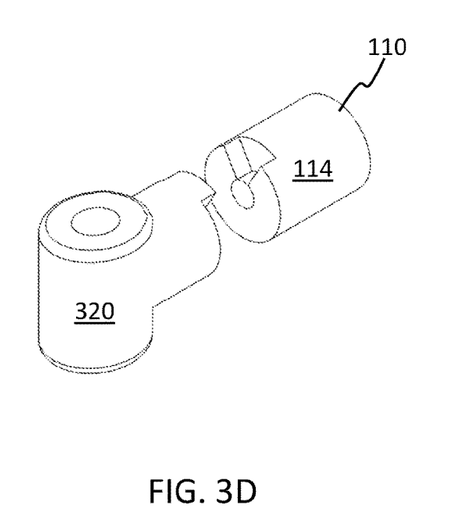
FIG. 3D is an exploded view of the fixed head of the clamp for use with an impact tool of FIGS. 1-2, according to an embodiment of the present disclosure.

FIGS. 3C and 3D are perspective views of the fixed head 320 of the clamp 100 for use with an impact tool 5 of FIGS. 1-2, according to an embodiment of the present disclosure. As shown, the fixed head 320 may not allow for rotational movement when the fixed head 320 is connected to the second-fixed jaw 114 of the frame 110 having the female opening that is cut to the same dimensions of the male insert. As may be appreciated, the fixed head 320 does not allow for rotational maneuverability of the impact tool 5 but rather holds the impact tool 5 in place.

Figure 4A:
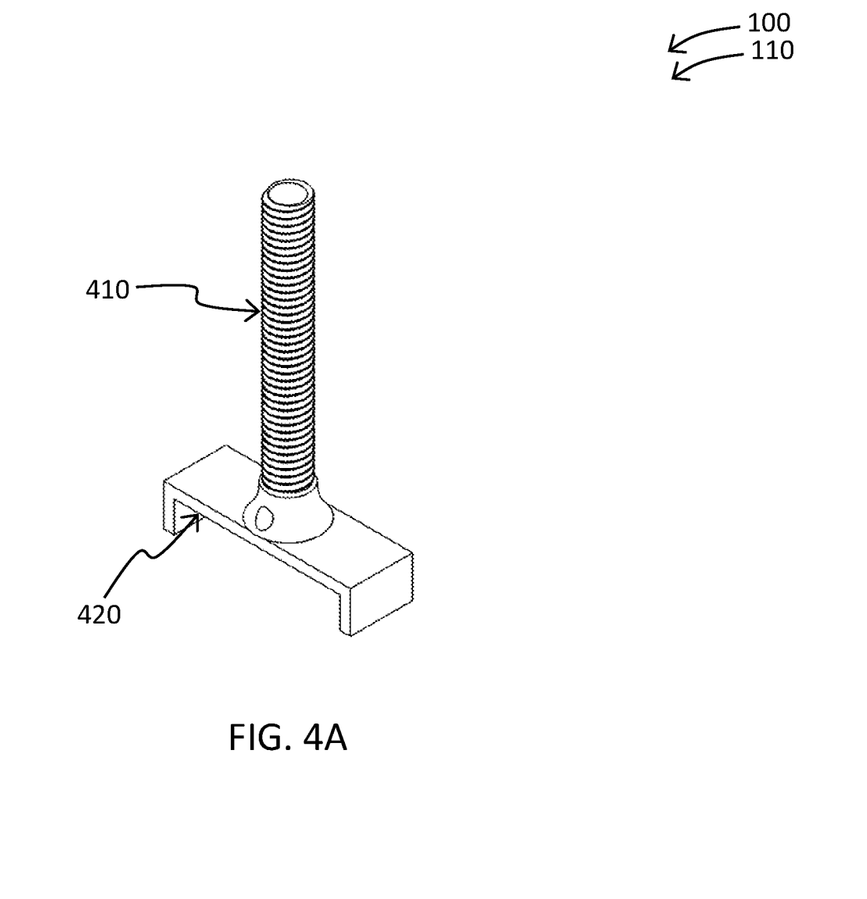
FIG. 4A is a perspective view of a ¾" bit attached to a ¾" rocker of the clamp for use with an impact tool, according to an embodiment of the present disclosure.

Referring now to FIG. 4A showing a perspective view of a ¾" bit 410 attached to a ¾" rocker 420 of the clamp 100 for use with an impact tool 5, according to an embodiment of the present disclosure. In one embodiment of the present invention, the clamp 100 may be used with a ¾" bit 410 comprising Teflon. Other materials may be used such as rubber or the like.

Figure 4B:
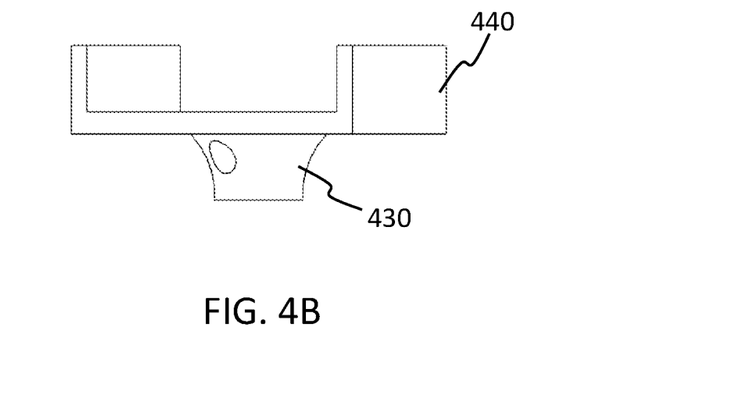
FIG. 4B is a perspective view of a 2" bit attached to a 2" rocker of the clamp for use with an impact tool, according to an embodiment of the present disclosure.

Referring now to FIG. 4B showing a perspective view of a 2" bit 430 attached to a 2" rocker 440 of the clamp 100 for use with an impact tool 5, according to an embodiment of the present disclosure. In one embodiment of the present invention, the clamp 100 may be used with a 2" bit 410 comprising Teflon. Other materials may be used such as rubber or the like.

It should be noted that in some embodiments there may be a flare at a bottom of either the ¾" rocker 420 or the 2" rocker 440. The flare may allow the ¾" rocker 420 or the 2" rocker 440 to overhang the threaded shaft. Further, it provides a stop at the bottom portion of the clamp 100 when disengaged from impact tool 5.

It should be noted that in some embodiments the ¾" rocker 420 or the 2" rocker 440 may comprise a roll pin. The roll pin may act to keep the ¾" rocker 420 or the 2" rocker 440 on the threaded shaft, providing an easy means for the user 40 to attach and detach.

According to an embodiment of the present disclosure, the clamp 100 for use with an impact tool 5 comprises the frame 110 including the first-fixed jaw 112, the second-fixed jaw 114, and the length 116 connecting the first-fixed jaw 112 to the second-fixed jaw 114. The frame 110 also includes integrally the first-fixed jaw 112, the second-fixed jaw 114, and the length 116 in a one-piece construction.

Further, the clamp 100 comprises the first-gusset 160 located where the first-fixed jaw 112 meets the length 116 of the frame 110 and the second-gusset 162 located where the second-jaw meets the length 116 of the frame 110. The first-fixed gusset and the second-fixed gusset are configured to provide structural force to the frame 110 of the frame 110 for improved durability of the clamp 100. The first-fixed jaw 112 comprises a weld block consisting of dimensions of 1" by 1". The first-fixed jaw 112 also comprises a screw 120 having a movable jaw 122 and a collar 124. The screw 120 may be held in length-adjustable stasis between the first-fixed jaw 112 and the second-fixed jaw 114. The movable jaw 122 and the collar 124 may be able to travel upwardly and alternatively downwardly in a rotary motion along an axis parallel to the length 116 when manipulated.

A weld handle 130 integrally may be coupled to the length 116 of the frame 110. The weld handle 130 may comprise a grip 132 and provide improved stability to the clamp 100 when held. A drive end may be located at a terminal end of the screw 120. The drive end may be configured to couple to the impact tool 5 via a socket 10 such that said clamp 100 is configured to manipulate at least two items such that said at least two items can be worked on based on an adjacent relationship.

Figure 5:
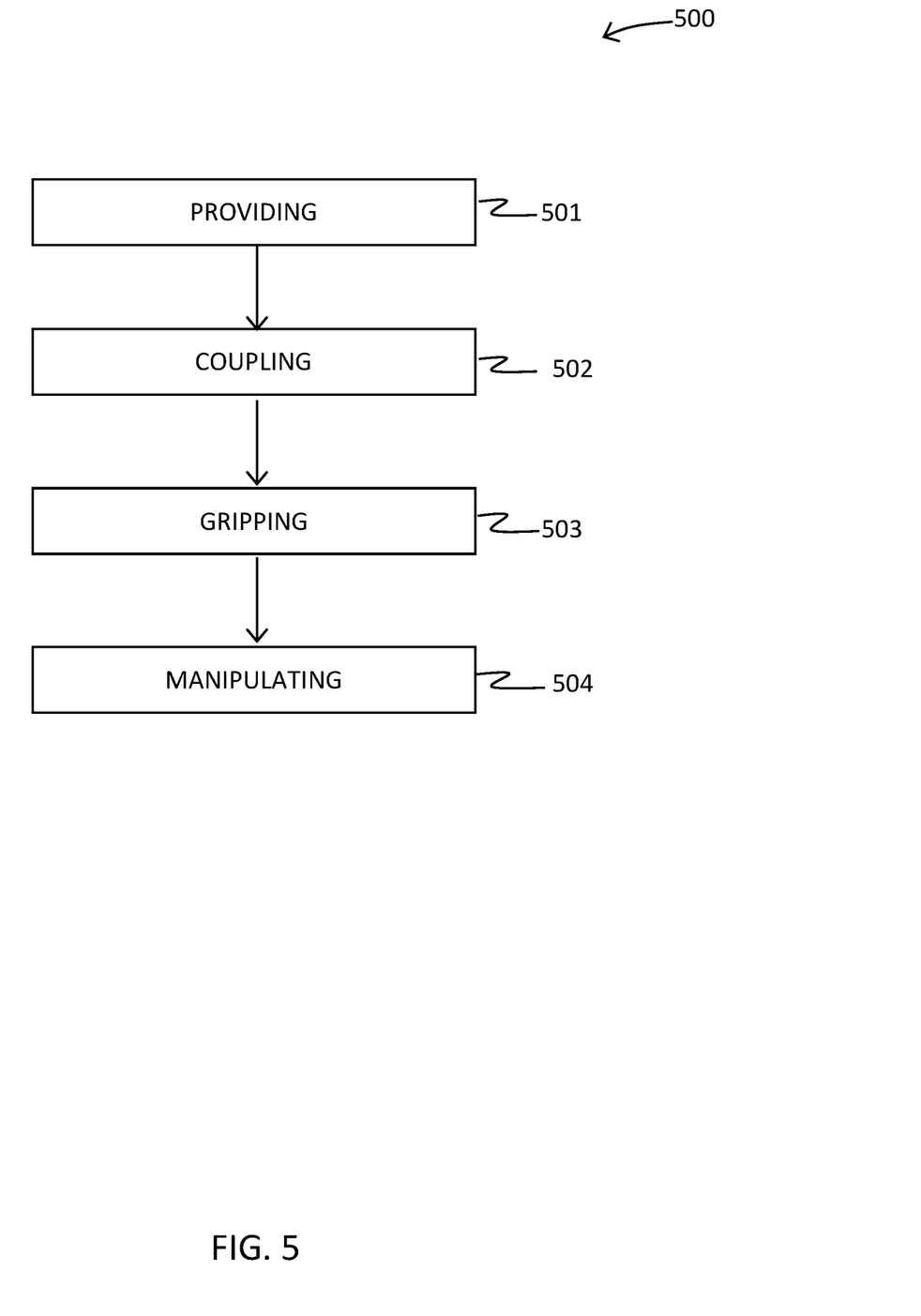
FIG. 5 is a flow diagram illustrating a method of use for the clamp for use with an impact tool, according to an embodiment of the present disclosure.

FIG. 5 is a flow diagram 550 illustrating a method for using 500 a clamp 100 in combination with an impact tool 5, according to an embodiment of the present disclosure. As illustrated, the a method for using 500 a clamp 100 in combination with an impact tool 5 may include the steps of: step one 501, providing the clamp 100 having a frame 110 including a first-fixed jaw 112, a second-fixed jaw 114, and a length 116 connecting the first-fixed jaw 112 to the second-fixed jaw 114, a first-gusset 160 located where the first-fixed jaw 112 meets the length 116 of the frame 110 and a second-gusset 162 located where the second-jaw meets the length 116 of the frame 110, a screw 120 may have a movable jaw 122 and a collar 124, the screw 120 held in length-adjustable stasis between the first-fixed jaw 112 and the second-fixed jaw 114, and a weld handle 130 integrally coupled to the length 116 of the frame 110; step two 502, coupling the impact tool to a terminal end of the screw 120 via a socket 10; step three 503, gripping the clamp 100 via the weld handle 130; and step four 504, manipulating at least two items such that the at least two items can be worked on based on an adjacent relationship via the clamp.

It should be noted that use of the clamp 100 is intended to reduce motions that may lead to injury and improve productivity time. Further, the clamp 100 serves as a functional conventional clamp 100 for everyday construction use. The carabiner can be used to hold the clamp 100 when it is desirable to let go for example when connecting the impact tool 5 with weld nut.

It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for the clamp for use with an impact tool 100 (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or

What is claimed is new and desired to be protected by Letters Patent is set forth in the appended claims:

1. A clamp for use with an impact tool, the clamp including:
a frame including a first-fixed jaw, a second-fixed jaw, and a length connecting the first-fixed jaw to the second-fixed jaw, a screw having a movable jaw and a collar, movable jaw held between the first-fixed jaw and the second-fixed jaw, the movable jaw and the collar able to travel upwardly and alternatively downwardly in a rotary motion along an axis parallel to the length when manipulated; and a head removably secured to the second-fixed jaw having a screw channel configured to receive the screw, such that when the head is separated from the second-fixed jaw the screw is detached from the frame; the second-fixed jaw oriented perpendicular to the length, wherein the head and second-fixed jaw cooperatively form an interior channel extending therethrough; wherein the interior channel and the second-fixed jaw are coaxially aligned along a longitudinal axis thereof, the longitudinal axis defined as extending between the length and the screw; the interior channel adapted to receive a first fastener such that the first fastener extends out a terminal end of the second-fixed jaw opposite of the screw; wherein a face of the head rests flush against a face of the second-fixed jaw when attached thereto; wherein a drive end is located at a terminal end of the screw configured to couple to the impact tool via a socket such that said clamp is configured to manipulate at least two items such that said at least two items can be worked on based on an adjacent relationship.

2. The clamp of claim 1 wherein the frame comprises at least one hole configured for connecting a carabiner clip to the clamp.

3. The clamp of claim 2 wherein a weld handle extending from the length, wherein the weld handle comprises an opening extending entirely from the first-fixed jaw to the second-fixed jaw.

4. The clamp of claim 1, wherein a first-fixed gusset located where the first-fixed jaw meets the length of the frame and a second-fixed gusset located where the second-fixed jaw meets the length of the frame provide structural force to the frame of the clamp for improved durability.

5. The clamp of claim 1, wherein the collar comprises a through-hole and a pin extending therethrough, wherein the pin allows a user to rotate the screw clockwise and alternatively counter-clockwise.

6. The clamp of claim 5, wherein the screw comprises a grind head at an opposite end of a weld nut.

7. The clamp of claim 6, wherein the screw and the grind head are configured in combination for coupling to the clamp to the impact tool.

8. The clamp of claim 7, wherein a proximal end of the grind head comprises a stop useful to prevent the socket from slipping down a thread of the screw.

9. The clamp of claim 8, wherein the grind head further comprises a through-hole configured to allow a pin to pass therethrough for aiding a user in rotating the pin.

10. The clamp of claim 1, further comprising a top screw downwardly-insertable through the first-fixed-jaw of the frame and configured for clamping the impact tool between the top screw and the grind head, wherein the top screw extends through opposing ends of the first-fixed jaw.

11. The clamp of claim 1, wherein the impact tool comprises a pneumatic power tool and alternatively an electric power tool.

12. The clamp for use with an impact tool of claim 1, wherein the face of the second-fixed jaw comprises a female opening configured to receive a male insert extending from the face of the head, wherein the female opening allows the head to rotate about the longitudinal axis 30 degrees when secured to the second-fixed jaw.

13. The clamp for use with an impact tool of claim 12, wherein the head is configured to rotate up to 15 degrees in a first direction and up to 15 degrees in an opposite second direction.

14. The clamp for use with an impact tool of claim 1, wherein the face of the second-fixed jaw comprises a female opening configured to receive a male insert extending from the face of the head, wherein the head is unable to rotate relative to the second-fixed jaw when secured thereto.

15. The clamp for use with an impact tool of claim 1, further comprising the first fastener extending through the interior channel and a second fastener securable to an end of the first fastener positioned exterior to the frame, wherein the second fastener is adapted to receive a torque from an actuator.

16. The clamp for use with an impact tool of claim 1, wherein the head comprises a male insert and the second-fixed jaw comprises a female opening that provides for rotation of the head about the longitudinal axis while still maintaining a connection to the frame.

17. The clamp for use with an impact tool of claim 1, wherein the head rotates while secured to the frame such that the movable jaw is configured maintain an offset position from a top screw, wherein the top screw is inserted through the first-fixed-jaw of the frame and configured for clamping the impact tool between the top screw and the grind head.

18. The clamp for use with an impact tool of claim 1, further comprising a space formed below a weld handle extending from the length and next to the second-fixed jaw, wherein the space allows a user to access the first fastener.

19. The clamp for use with an impact tool of claim 1, further comprising a top screw downwardly-inserted through the first-fixed-jaw of the frame and having a U-shaped rocker extending from an end thereof, wherein the U-shaped rocker is positioned between the first-fixed jaw and the second fixed jaw.

20. A method for using a clamp in combination with an impact tool, the method comprising the steps of: providing the clamp having; a frame including a first-fixed jaw, a second-fixed jaw, and a length connecting the first-fixed jaw to the second-fixed jaw; a head removably secured to the second-fixed jaw having a screw channel configured to receive a screw, such that when the head is separated from the second-fixed jaw the screw is detached from the frame; the second-fixed jaw oriented perpendicular to the length, wherein the head and second- fixed jaw cooperatively form an interior channel extending therethrough; wherein the interior channel and the second-fixed jaw are coaxially aligned along a longitudinal axis thereof, the longitudinal axis defined as extending between the length and the screw; the interior channel adapted to receive a first fastener such that the first fastener extends out a terminal end of the second-fixed jaw opposite of the screw; wherein a face of the head rests flush against a face of the second-fixed jaw when attached thereto; coupling the impact tool to a terminal end of the screw via a socket; gripping the clamp via a weld handle; and manipulating at least two items such that said at least two items can be worked on based on an adjacent relationship via the clamp.

\* \* \* \* \*